Patented Dec. 30, 1941

2,268,033

UNITED STATES PATENT OFFICE 2,268,033

PROCESS OF PREPARING 2-AMINO-4-CHLOROPYRIMIDINE

Martin Everett Hultquist, North Plainfield, and Erwin Kuh, New Brunswick, N. J., assignors to American Cyanamid Company, New York, N. Y., a corporation of Maine No Drawing. Application May 24, 1941, Serial No. 394,998

9 Claims. (Cl. 260—251)

This invention relates to an improved process for the manufacture of 2-amino-4-chloropyrimidine.

This product is useful as an intermediate in the production of sulfanilamido pyrimidines which are formed by the condensation of acetylamino or nitrobenzene sulfonyl halides with amino pyrimidines and which are chemotherapeutic compounds of great value in the treatment of infectious diseases.

The 2-amino-4-chloropyrimidine has been prepared on a laboratory scale in the past by the reaction of isocytosine with phosphorus oxychloride. This process, while capable of producing 2-amino-4-chloropyrimidine is very inefficient giving a yield of only about 40% of the theory and is open to many disadvantages particularly when operating on a large scale.

In the U. S. patent to English No. 2,224,811, a greatly improved process is described in which isocytosine sulfate is used instead of the free base. This results in a remarkable increase in yield, more than double the yield obtainable by the former known process. The English process has been used on an industrial scale and is an entirely practical method of producing 2-amino-4-chloropyrimidine at a reasonable price. However, in spite of the enormous improvement over the old process obtained by using isocytosine sulfate instead of isocytosine, the English process still shares some of the disadvantages incident to operating the phosphorous oxychloride in large excess and the process is difficult to control and trouble with foaming is sometimes encountered.

The present invention retains all of the advantages of the English process with respect to high yields and the like, but is further effective in reducing the remaining disadvantages due to the exothermic reaction and effects great savings in the amount of phosphorus oxychloride required.

According to the present invention we have found that at least one factor in the high yield obtained in the English process is the formation of some chlorsulfonic acid in the reaction mixture. This chlorsulfonic acid in the English process is undoubtedly formed by reaction of isocytosine sulfate with some of the large excess of phosphorus oxychloride which is always present in the English process, the process requiring normally at least 4–500% molar excess of phosphorus oxychloride. However, sulfuric acid or sulfates react with phosphorus oxychloride to form chlorsulfonic acid with a great deal of violence, the reaction is very strongly exothermic, and we believe that to a considerable extent some of the difficulties which were incident to the English process were due to this reaction.

According to the present invention we react isocytosine with phosphorus oxychloride in the presence of chlorsulfonic acid which may be either added as such or may be formed by a small amount of isocytosine acid sulfate, the crude reaction product obtained in the production of isocytosine from formylacetic acid and sulfuric acid, the amount of the isocytosine acid sulfate being sufficiently small so that the exotherm of the reaction is taken care of without difficulties of foaming, excessive cooling requirements, or the like. In either case the main reaction is effected between phosphorus oxychloride and isocytosine in the presence of chlorsulfonic acid, and not between phosphorus oxychloride and isocytosine sulfate with concomitant formation of chlorsulfonic acid. The process of the present invention therefore, not only retains all of the advantages of the English process but gives even higher yields without manipulative difficulties. At the same time, the amount of phosphorus oxychloride is reduced greatly, for example to 1½ moles of oxychloride per mole of isocytosine. This results in a very material saving of phosphorus oxychloride, the yield is improved, cooling difficulties are avoided and difficulties due to foaming and other troubles incident to the violently exothermic reaction of isocytosine sulfate and phosphorus oxychloride are removed. The process of the present invention, therefore, makes notable savings in plant operation as well as materials cost. Yields ranging from 85 to over 90% are obtained.

The amount of chlorsulfonic acid required is not critical, excellent results being obtained with one-fourth mole of chlorsulfonic acid per mole of isocytosine. This is the preferred amount as larger quantities do not increase the yield materially and involve higher cost for raw material. The relatively small amount of chlorsulfonic acid present as compared to the English process where there is at least one-half mole of sulfuric acid per mole of isocytosine, further avoids to a very large extent sulfonation of the isocytosine, or the 2-amino-4-chloropyrimidine, one of the factors which lowers yields.

The invention will be described in further detail in conjunction with the following specific examples.

*Example 1*

29 parts of chlorsulfonic acid was added to 308 parts of phosphorus oxychloride followed by 111 parts of isocytosine, with agitation. The mixture was heated at 90–95° C. for five hours, then drowned in ice. The mixture was neutralized with ammonia at 10° C. to a pH of 7–8 giving a final volume of 3000 cc. The precipitate of 2-amino-4-chloropyrimidine was filtered off, washed with water until free of chlorides, and dried. The yield was 120 parts or 93% of theory based on the isocytosine.

*Example 2*

29 parts of chlorosulfonic acid was added to 228 parts of phosphorus oxychloride followed by 111 parts of isocytosine. The mixture was heated under agitation at 90° C. for three hours. The reaction mixture was drowned in ice and neutralized with ammonium hydroxide to a pH of 7–8, giving a final volume of 2800 cc. The precipitate of 2-amino-4-chloropyrimidine was filtered off, washed with water and dried. The yield was 112 parts or 87% of theory.

*Example 3*

52.5 parts of isocytosine acid sulfate was added to 228 parts of phosphorus oxychloride and the mixture was heated to 90° C. for 5 minutes. An exothermic reaction set in at about 80° C. but was easily controlled. The reaction mixture was cooled to 50° C. and 83.3 parts of isocytosine was added. The temperature was raised to 90°–93° C. and held for 2¾ hours, after which the mixture was cooled to 60° C., drowned in ice, neutralized with ammonia and the 2-amino-4-chloropyrimidine was filtered, washed and dried. The yield was 86.5% of theory.

We claim:

1. A method of producing 2-amino-4-chloropyrimidine which comprises bringing about reaction between phosphorus oxychloride and isocytosine in the presence of a small amount of chlorsulfonic acid.

2. A method of producing 2-amino-4-chloropyrimidine which comprises bringing about reaction between phosphorus oxychloride and isocytosine in the presence of about one-fourth of a mole of chlorsulfonic acid per mole of isocytosine.

3. A method according to claim 1 in which the chlorsulfonic acid is added to the reaction mixture in the pre-formed state.

4. A method according to claim 2 in which the chlorsulfonic acid is added to the reaction mixture in the pre-formed state.

5. A method of producing 2-amino-4-chloropyrimidine which comprises heating a mixture of a small amount of an isocytosine sulfate with a large excess of phosphorus oxychloride, cooling the reaction mixture and then adding isocytosine to bring about reaction between the phosphorus oxychloride and isocytosine in the presence of chlorsulfonic acid formed by reaction of the isocytosine sulfate with the oxychloride, the amount of isocytosine being much greater than the amount of isocytosine sulfate used.

6. A method of producing 2-amino-4-chloropyrimidine which comprises heating a mixture of a small amount of isocytosine acid sulfate with a large excess of phosphorus oxychloride, cooling the reaction mixture and then adding isocytosine to bring about reaction between the phosphorus oxychloride and isocytosine in the presence of chlorsulfonic acid formed by reaction of the isocytosine acid sulfate with the oxychloride, the amount of isocytosine being much greater than the amount of isocytosine sulfate used.

7. A method according to claim 6 in which the molar amount of the isocytosine acid sulfate is approximately one-fourth the molar amount of the isocytosine.

8. A method according to claim 1 in which the amount of phosphorus oxychloride does not exceed two moles of the oxychloride for each mole of isocytosine.

9. A method according to claim 5 in which the amount of phosphorus oxychloride does not exceed two moles of the oxychloride for each mole of isocytosine.

MARTIN EVERETT HULTQUIST.
ERWIN KUH.